United States Patent [19]

Hendrick

[11] 3,862,970

[45] Jan. 28, 1975

[54] 5-CHLORO-2,4-DIOLEFINIC FATTY ACIDS AND ESTERS

[75] Inventor: Clive A. Henrick, Palo Alto, Calif.

[73] Assignee: Zoecon Corporation, Palo Alto, Calif.

[22] Filed: Apr. 20, 1973

[21] Appl. No.: 352,883

[52] U.S. Cl............ 260/408, 260/455 R, 260/502.6, 260/593 H, 260/594, 260/DIG. 44, 424/301, 424/312, 424/318, 424/DIG. 12
[51] Int. Cl... C07c 69/62, C07c 153/00, A01n 9/24
[58] Field of Search............................ 260/408

[56] References Cited
UNITED STATES PATENTS
3,657,291    4/1972    Jarolim et al.................... 260/408
3,793,353    2/1974    Henrick.......................... 260/405

Primary Examiner—Lewis Gotts
Assistant Examiner—Diana G. Rivers
Attorney, Agent, or Firm—Donald W. Erickson; Lee-Louise H. Priest

[57] ABSTRACT

Aliphatic substituted diolefinic acids and esters, thiolacids and thiolesters, and derivatives thereof, intermediates therefor, synthesis thereof and the control of insects.

13 Claims, No Drawings

5-CHLORO-2,4-DIOLEFINIC FATTY ACIDS AND ESTERS

This invention relates to novel aliphatic diolefinic compounds, intermediates therefor, synthesis thereof and the control of insects. More particularly, the novel olefinic compounds of the present invention are represented by the following formula A:

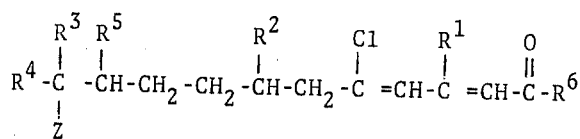

wherein, $R^6$ is OR or SR, in which R is hydrogen, lower alkyl, cycloalkyl, lower alkenyl or lower alkynyl;

each of $R^1$, $R^2$, $R^3$ and $R^4$ is lower alkyl;

$R^5$ is hydrogen or methyl; and

Z is hydrogen or lower alkoxy.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 g. to 10 g. per insect. Suitable carrier substances include liquid or solid inert carriers, such as water, acetone xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25 percent of the active compound is employed. The formulations can include insect attractants, emulsifying agents or wetting agents to assist in the application and effectiveness of the active ingredient.

The presence of an olefinic bond at position C-2 and C-4 of the compound of formula A gives rise to four isomers, each of which is embraced by the present invention. In the application of the compounds, there is generally employed a mixture of the C-2 trans and cis isomers, the C-2 trans isomers being the preferred embodiment for the control of insects. In the specific examples hereinafter, when isomerism is not specified, it is understood to include a mixture of isomers, which if desired can be separated using known separation methods.

In the description hereinafter, each of R–$R^5$ and Z is as defined above, unless otherwise specified.

The compounds of the present invention can be prepared as outlined below:

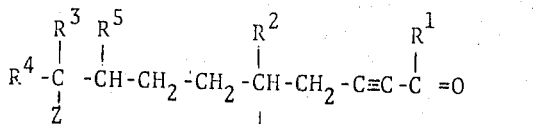

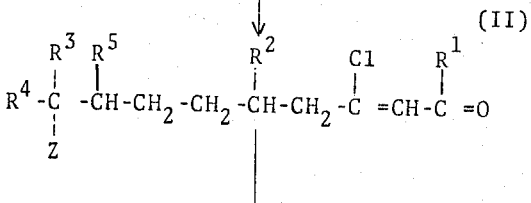

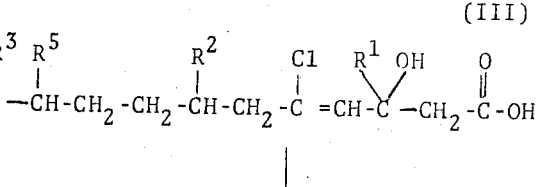

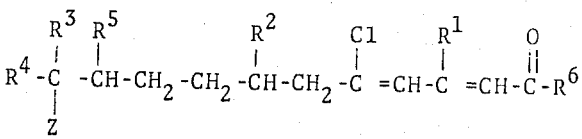

In the above formula $R^6$ is OR, in which R is lower alkyl.

In the practice of the above outlined synthesis the chlorovinyl ketone of formula II is prepared from the corresponding acetylenic ketone by treatment with hydrogen chloride in an organic solvent inert to the reaction, such as chloroform, in the presence of small amounts of a metal chloride as a catalyst, such as stannous chloride, cuprous chloride or the like, at a temperature of about −40° C. For the syntheses of β-chlorovinyl ketones see J. W. Kroger et al., J. Org. Chem 1, 163 (1936). The olefinic chloroketone of formula II is then reacted with the bislithio derivative of acetic acid in an organic solvent inert to the reaction such as ether, tetrahydrofuran, hexane or similar solvents, at a temperature of about 0° C to room temperature or above. The esters of formula A are obtained from the hydroxy acids of formula III by dehydration and esterification. Treatment of the compound of formula III with thionyl chloride or bromide, phosphorus trichloride, or the like, in an organic solvent inert to the reaction such as benzene, ether or similar solvents yields the unsaturated acid halide which is then reacted with the alcohol corresponding to the ester moiety desired. Dehydration is also obtained by acetylation of the hydroxy acid of formula III with acetic acid anhydride in presence of pyridine and treatment of the corresponding acetate with a base such as potassium t-butoxide in an organic solvent inert to the reaction such as ether, tetrahydrofuran or the like. Other esters of the present invention can be prepared by transesterification or conversion of the acid of formula A ($R^6$=OR, in which R is hydrogen) into the acid halide by treatment with oxalyl chloride or bromide, thionyl chloride or bromide, and the like and then reacting the acid halide with the desired alcohol.

The thiolacids and thiolesters of formula A are prepared from the acid chloride by reaction with sodium hydrogen sulfide and alkyl mercaptan or alkyl lead mercaptide respectively.

The term "lower alkyl", as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "cycloalkyl", as used herein, refers to a cyclic alkyl group containing three to eight carbon atoms, e.g., cyclopropyl, cyclopentyl and cyclohexyl.

The term "lower alkenyl", as used herein, refers to an ethylenically unsaturated hydrocarbon group, branched or straight chain, having a chain length of two to six carbon atoms, e.g., allyl, vinyl, 3-butenyl, 2-hexenyl and i-propenyl.

The term lower alkynyl, as used herein, refers to an acetylenically unsaturated hydrocarbon group, branched or straight chain, having a chain length of two to six carbon atoms, e.g., ethynyl, 2-propynyl, 3-pentynyl.

Whenever any of the foregoing terms is modified by the word lower, the chain length of the group is not more than six carbon atoms.

The following examples are provided to illustrate the present invention. Temperature is given in degrees Centigrade.

EXAMPLE 1

20 g. of 6,10-dimethylundec-3-yn-2-one is dissolved in 500 ml. chloroform and the solution is cooled to −40 to −50°C in a bath of liquid ammonia. Dry hydrogen chloride is passed into the cold solution in the presence of a trace of cuprous chloride. After 24 hours the chloroform is removed, the residue dissolved in benzene, washed with sodium carbonate solution, then with water, dried over magnesium sulfate and evaporated to yield 4-chloro-6,10-dimethylundec-3-en-2-one which is further purified by fraction distillation.

EXAMPLE 2

The process of Example 1 is repeated using each of the acetylenic ketones under Column 1 to prepare the respective chlorovinyl ketone under Column II.

COLUMN I 6,10-dimethyldodec-3-yn-2-one
6-ethyl-10-methyldodec-3-yn-2-one
6,10-diethyldodec-3-yn-2-one
10-methoxy-6,10-dimethylundec-3-yn-2-one
6,9,10-trimethylundec-3-yn-2-one
10-methoxy-6,9,10-trimethylundec-3-yn-2-one
10-methoxy-6-ethyl-10-methyldodec-3-yn-2-one
10-ethoxy-6,10-dimethylundec-3-yn-2-one

COLUMN II 4-chloro-6,10-dimethyldodec-3-en-2-one
4-chloro-6-ethyl-10-methyldodec-3-en-2-one
4-chloro-6,10-diethyldodec-3-en-2-one
4-chloro-10-methoxy-6,10-dimethylundec-3-en-2-one
4-chloro-6,9,10-trimethylundec-3-en-2-one
4-chloro-10-methoxy-6,9,10-trimethylundec-3-en-2-one
4-chloro-10-methoxy-6-ethyl-10-methyldodec-3-en-2-one
4-chloro-10-ethoxy-6,10-dimethylundec-3-en-2-one

EXAMPLE 3

50.5 ml. of 1.55 m. n-butyllithium in hexane is added dropwise to a solution of 11.0 ml. dissopropylamine in 400 ml. of dry tetrahydrofuran, under nitrogen at 0°. After stirring the solution for 1 hour at 0° and 3 hours at room temperature, 2.26 g. acetic acid in 25 ml. dry tetrahydrofuran is added. The solution is stirred for another 30 minutes at 0° and 90 minutes at 40°–50° and 8.7 g. 4-chloro-6,10-dimethylundec-3-en-2-one is added at 0°. After stirring overnight the reaction is quenched by addition of 400 ml. 0.1 N hydrochloric acid and extracted with ether. The ether extracts are extracted with 0.1N sodium hydroxide and the base extracts acidified with 3N hydrochloric acid and extracted with ether. The ether layer is washed with brine, dried over magnesium sulfate and evaporated to give 3-hydroxy-5-chloro-3,7,11-trimethyldodec-4-enoic acid.

EXAMPLE 4

Using each of the ketones under Column II as the starting material in the process of Example 3, there is prepared the respective hydroxy acid under Column III.

COLUMN III 3-hydroxy-5-chloro-3,7,11-trimethyltridec-4-enoic acid
3-hydroxy-5-chloro-3,11-dimethyl-7-ethyltridec-4-enioc acid
3-hydroxy-5-chloro-3-methyl-7,11-diethyltridec-4-enoic acid
3-hydroxy-5-chloro-11-methoxy-3,7,11-trimethyldodec-4-enoic acid
3-hydroxy-5-chloro-3,7,10,11-tetramethyldodec-4-enoic acid
3-hydroxy-5-chloro-11-methoxy-3,7,10,11-tetramethyldodec-4-enoic acid
3-hydroxy-5-chloro-11-methoxy-3,11-dimethyl-7-ethyltridec-4-enoic acid
3-hydroxy-5-chloro-11-ethoxy-3,7,11-trimethyldodec-4-enoic acid

EXAMPLE 5

To a solution of 8.2 g. 3-hydroxy-5-chloro-3,7,11-trimethyldodec-4-enoic acid and 7.6 g. diisopropylethylamine in 100 ml. benzene is added under nitrogen at 0°, 5.1 ml. thionyl chloride in 25 ml. benzene. The reaction is allowed to warm to room temperature and stirred for 16 hours. The reaction is then cooled to 0° C and to it is added a solution of 6.5 g. ethanol in 20 ml. benzene. The mixture is allowed to warm to room temperature and stirred for 4 hours. The solution is then washed with 10 percent hydrochloric acid, 10 percent sodium carbonate and brine, dried over magnesium sulfate and evaporated to give ethyl-5-chloro-3,7,11-trimethyldodeca-2,4-dienoate which is further purified by distillation.

EXAMPLE 6

By using the process of Example 5 with an alcohol such as methanol, i-propanol, t-butanol, cyclohexanol, instead of ethanol, the novel corresponding esters are prepared, i.e., methyl, i-propyl, t-butyl, cyclohexyl-5-chloro-3,7,11-trimethyldodeca-2,4-dienoate.

EXAMPLE 7

Each of the hydroxy esters under Column III is dehydrated and esterified following the procedure of Example 5 to produce the corresponding unsaturated ethyl ester under Column IV.

COLUMN IV ethyl 5-chloro-3,7,11-trimethyltrideca-2,4-dienoate
ethyl 5-chloro-3,11-dimethyl-7-ethyltrideca-2,4-dienoate
ethyl 5-chloro-3-methyl-7,11-diethyltrideca-2,4-dienoate
ethyl 5-chloro-11-methoxy-3,7,11-trimethyldodeca-2,4-dienoate
ethyl 5-chloro-3,7,10,11-tetramethyldodeca-2,4-dienoate
ethyl 5-chloro-11-methoxy-3,7,10,11-tetramethyldodeca-2,4-dienoate
ethyl 5-chloro-11-methoxy-3,11-dimethyl-7-ethyltrideca-2,4-dienoate
ethyl 5-chloro-11-ethoxy-3,7,11-trimethyldodeca-2,4-dienoate

EXAMPLE 8

1 g. ethyl 5-chloro-3,7,11-trimethyldodeca-2,4-dienoate, 60 ml. of methanol, 0.5 g. of sodium hydroxide and 6 ml. of water are stirred at about 30° for 3 days. The mixture is then diluted with water, neutralized and extracted with ether. The organic phase is washed with water, dried over sodium sulfate and evaporated to yield 5-chloro-3,7,11-trimethyldodeca-2,4-dienoic acid.

EXAMPLE 9

To 1 g. 5-chloro-3,7,11-trimethyldodeca-2,4-dienoic acid in 30 ml. of benzene is added a slight excess of oxalyl chloride at 0° and the mixture is stirred for 2 hours at room temperature. The product is worked up by removal of solvent in vacuo and extraction with pentane to yield 5-chloro-3,7,11-trimethyldodeca-2,4-dienoyl chloride.

EXAMPLE 10

Two equivalents propargyl alcohol are added to 1 g. 5-chloro-3,7,11-trimethyldodeca-2,4-dienoyl chloride and the mixture is heated at about 50° for about 15 minutes. Excess alcohol is removed by evaporation to yield prop-2-yn-1-yl 5-chloro-3,7,11-trimethyldodeca-2,4-dienoate, which is purified by chromatography.

Similarly by using other alcohols such as cyclohexyl alcohol, t-butyl alcohol, i-propanol, vinyl alcohol, the corresponding esters are obtained.

EXAMPLE 11

2.5 g. 3-hydroxy-5-chloro-3,7,11-trimethyldodec-4-enoic acid is dissolved in 20 ml. methylene chloride, treated with 2.5 g. acetic acid anhydride and 2 g. pyridine and boiled for 18 hours. Evaporation of the solvent gives 3-acetoxy-5-chloro-3,7,11-trimethyldodec-4-enoic acid.

EXAMPLE 12

1,5 g. 3-acetoxy-5-chloro-3,7,11-trimethyldodec-4-enoic acid is dissolved in 100 ml. tetrahydrofuran and treated with 2.2 equiv. potassium t-butoxide at room temperature for 60 hours. The reaction mixture is quenched with water, diluted, and the neutral impurities extracted into ether. The aqueous layer is acidified with 0.1N hydrochloric acid and extracted with ether. The ether extract is washed with water until neutral, and brine, dried over magnesium sulfate and evaporated to yield 5-chloro-3,7,11-trimethyldodeca-2,4-dienoic acid.

EXAMPLE 13

To 1.4 g. dry NaHs in 20 ml. dry dimethylformamide, cooled in an ice bath, is added 3.5 g, 5-chloro-3,7,11-trimethyldodeca-2,4-dienoyl chloride, under nitrogen. The reaction is warmed to room temperature and stirred for 1.5 hours. The reaction is then poured into water. To the mixture is added about 50 ml. of ether/hexane (1:1) and 10 percent NaOH and the neutral impurities extracted into the organic layer. The aqueous layer is acidified with 10 percent sulfuric acid solution and extracted with ether/hexane. The combined organic layers are washed with water until neutral and dried over calcium sulfate. After filtering, solvents are evaporated leaving 5-chloro-3,7,11-trimethyldodeca-2,4-dienthioic S-acid

EXAMPLE 14

Into a flask equipped with an addition funnel, stirrer, thermometer and condenser is placed 16 g. of 50 percent aqueous NaOH and 100 ml. of ether. To this mixture is added 16 ml. of 97 percent ethanethiol in 5 ml. of ether. After addition is complete, the reaction is allowed to cool to ambient temperature, and to it is added under nitrogen, a solution of 117 g. of 5-chloro-3,7,11-trimethyldodeca-2,4-dienoyl chloride in 100 ml. of ether. The reaction is stirred for one hour at ambient temperature and then washed with 100 ml. of 2N NaOH, 100 ml. of water, and 100 ml. of brine. After drying over sodium sulfate, solvent is evaporated at reduced pressure to yield S-ethyl 5-chloro-3,7,11-trimethyldodeca-2,4-dienthioate.

EXAMPLE 15

To a solution of 7.17 g. of 5-chloro-3,7,11-trimethyltrideca-2,4-dienoic acid and 125 ml. of dry benzene, under nitrogen, is added 7 ml. of oxalyl chloride. The reaction mixture is left 1.5 hours at room temperature and heated at 60° for 0.5 hour. The solvent is evaporated off and 125 ml. of fresh dry benzene and 4.7 g. of ethylmercaptan added. The mixture is stirred for 2 hours and then refluxed gently for about 16 hours. After cooling, the mixture is poured in water and ether is added. The organic phase is separated and washed with aqueous sodium bicarbonate and brine, dried over calcium sulfate and evaporated to give S-ethyl 5-chloro-3,7,11-trimethyltrideca-2,4-dienthioate.

EXAMPLE 16

By use of mercaptans such as butyl mercaptan, cyclohexylmercaptan, i-propyl mercaptan in the procedure of Example 15 the respective thioate esters are prepared.

EXAMPLE 17

Nineteen grams 5-chloro-3,7,11-trimethyldodeca-2,4-dienoyl chloride is added slowly to 13.4 g. ethyl lead mercaptide covered with ether. The mixture is allowed to stand overnight and then filtered. The filtrate is evaporated under reduced pressure to yield S-ethyl 5-chloro-3,7,11-trimethyldodeca-2,4-dienthioate, which can be purified by chromatography.

EXAMPLE 18

To a mixture of 4.0 g. of 5-chloro-3,7,11-trimethyldodeca-2,4-dienthioic S-acid, 4.0 g. of 3-chloropropyne, 14 ml. of ether and 28 ml. of dimethylformamide, cooled to 5°, is added 6.3 ml. of 2,4-lutidine. The reaction is then worked up, after 10 days, by pouring into water and extracting with ether. The combined organic layers are washed with 2N sulfuric acid, aqueous sodium bicarbonate, water until neutral, water and brine and then dried over calcium sulfate and the solvent evaporated to yield S-2'-propynyl 5-chloro-3,7,11-trimethyldodeca-2,4-dienthioate, which is purified by preparative thin-layer chromatrography.

EXAMPLE 19

The process of Example 13 is repeated using each of the acid chlorides under Column V to prepare the thioic acids under Column VI.

COLUMN V 5-chloro-3,7,11-trimethyltrideca-2,4-dienoyl chloride
5-chloro-3,11-dimethyl-7-ethyltrideca-2,4-dienoyl chloride
5-chloro-3-methyl-7,11-diethyltrideca-2,4-dienoyl chloride
5-chloro-11-methoxy-3,7,11-trimethyldodeca-2,4-dienoyl chloride
5-chloro-3,7,10,11-tetramethyldodeca-2,4-dienoyl chloride
5-chloro-11-methoxy-3,7,10,11-tetramethyldodeca-2,4-dienoyl chloride
5-chloro-11-methoxy-3,11-dimethyl-7-ethyltrideca-2,4-dienoyl chloride
5-chloro-11-ethoxy-3,7,11-trimethyldodeca-2,4-dienoyl chloride

COLUMN VI 5-chloro-3,7,11-trimethyltrideca-2,4-dienthioic S-acid
5-chloro-3,11-dimethyl-7-ethyltrideca-2,4-dienthioic S-acid
5-chloro-3-methyl-7,11-diethyltrideca-2,4-dienthioic S-acid
5-chloro-11-methoxy-3,7,11-trimethyldodeca-2,4-dienthioic S-acid
5-chloro-3,7,10,11-tetramethyldodeca-2,4-dienthioic S-acid
5-chloro-11-methoxy-3,7,10,11-tetramethyldodeca-2,4-dienthioic S-acid
5-chloro-11-methoxy-3,11-dimethyl-7-ethyltrideca-2,4-dienthioic S-acid
5-chloro-11-ethoxy-3,7,11-trimethyldodeca-2,4-dienthioic S-acid

EXAMPLE 20

Using each of the acid chlorides under Column V in the process of Examples 14, 15 or 17 the thioate esters under Column VII are prepared.

COLUMN VII

S-ethyl 5-chloro-3,7,11-trimethyltrideca-2,4-dienthioate
S-ethyl 5-chloro-3,11-dimethyl-7-ethyltrideca-2,4-dienthioate
S-ethyl 5-chloro-3-methyl-7,11-diethyltrideca-2,4-dienthioate
S-ethyl 5-chloro-11-methoxy-3,7,11-trimethyldodeca-2,4-dienthioate
S-ethyl 5-chloro-3,7,10,11-tetramethyldodeca-2,4-dienthioate
S-ethyl 5-chloro-11-methoxy-3,7,10,11-tetramethyldodeca-2,4-dienthioate
S-ethyl 5-Chloro-11-methoxy-3,11-dimethyl-7-ethyltrideca-2,4-dienthioate
S-ethyl 5-chloro-11-ethoxy-3,7,11-trimethyldodeca-2,4-dienthioate

EXAMPLE 21

Two grams 3-hydroxy-5-chloro-3,7,11-trimethyldodec-4-enoic acid is dissolved in 50 ml. ether and added to 1.5 equiv. 1-ethyl-3-p-tolyltriazene in 20 ml. ether under nitrogen. After refluxing for 3 hours the solution is made acidic with aqueous $3N-H_2SO_4$, then is washed with water and brine, dried over magnesium sulfate and evaporated to yield ethyl 3-hydroxy-5-chloro-3,7,11-trimethyldodec-4-enoate which is further purified by fractional distillation or thin-layer chromatography.

EXAMPLE 22

To a mixture of 14.6 g. (0.11 mole) anhydrous aluminum chloride and 190 ml. carbon tetrachloride, at 0° under argon, is added a mixture of 15.2 g. (0.1 mole) 4,8-dimethylnon-1-yne and 8.8 g. (0.11 mole) acetyl chloride over a period of one hour. The mixture is stirred overnight. Then the mixture is filtered, water and ether added and the pH adjusted to about 5 with aqueous 3N sulfuric acid. The ether layer is separated, washed with water and brine, and dried over calcium sulfate. Solvent is removed to yeild 4-chloro-6,10-dimethylundec-3-en-2-one which can be further purified by distillation.

What is claimed is:

1. A compound selected from those of the following formula

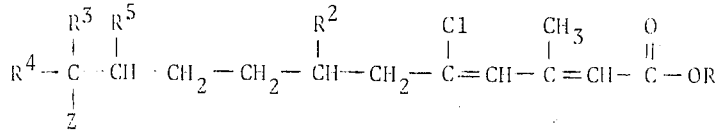

wherein,
Z is hydrogen or lower alkoxy;
R is hydrogen, lower alkyl, cycloalkyl, lower alkenyl or lower alkynyl;
each of $R^2$, $R^3$ and $R^4$ is methyl or ethyl; and
$R^5$ is hydrogen or methyl.

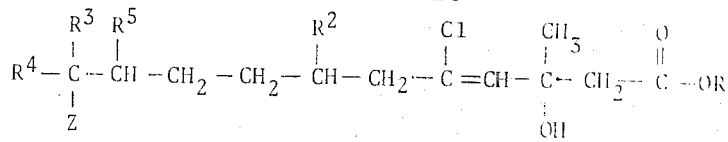

wherein,
Z is hydrogen or lower alkoxy;
each of $R^2$, $R^3$ and $R^4$ is methyl or ethyl;
$R^5$ is hydrogen or methyl; and
R is hydrogen or lower alkyl.

2. A compound according to claim 1 wherein R is hydrogen; each of $R^2$ and $R^3$ is methyl; and Z is hydrogen, methoxy or ethoxy.

3. A compound according to claim 2 wherein $R^5$ is hydrogen.

4. A compound according to claim 3 wherein Z is hydrogen or methoxy.

5. A compound according to claim 1 wherein R is lower alkyl or lower alkynyl.

6. A compound according to claim 5 wherein each of $R^2$ and $R^3$ is methyl and Z is hydrogen or methoxy.

7. A compound according to claim 6 wherein $R^5$ is hydrogen.

8. A compound according to claim 7 wherein R is methyl, ethyl, isopropyl, or propargyl.

9. A compound selected from those of the following formula:

10. A compound according to claim 9 wherein Z is hydrogen, methoxy or ethoxy; R is hydrogen; and each of $R^2$ and $R^3$ is methyl.

11. A compound according to claim 10 wherein $R^5$ is hydrogen.

12. A compound according to claim 9 wherein R is methyl, ethyl or isopropyl; each of $R^2$ and $R^3$ is methyl; and Z is hydrogen, methoxy or ethoxy.

13. A compound according to claim 12, wherein $R^5$ is hydrogen.

* * * * *